US006816270B1

(12) United States Patent
Cooper et al.

(10) Patent No.: US 6,816,270 B1
(45) Date of Patent: Nov. 9, 2004

(54) METHOD AND APPARATUS FOR SUPPORTING APPLICATION AND DEVICE INDEPENDENT PRINT SUPPORT

(75) Inventors: Michael Richard Cooper, Austin, TX (US); Rabindranath Dutta, Austin, TX (US); Mark Joseph Hamzy, Austin, TX (US); Mark Wayne Vanderwiele, Austin, TX (US); Peter A. Zannucci, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,388

(22) Filed: Mar. 25, 1999

(51) Int. Cl.[7] .............................................. G06F 15/00
(52) U.S. Cl. ...................... 358/1.13; 358/1.15; 358/296
(58) Field of Search ............................... 358/1.15, 296, 358/328, 1.13; 399/204

(56) References Cited

U.S. PATENT DOCUMENTS

| | | | |
|---|---|---|---|
| 4,758,946 A | 7/1988 | Shar et al. ................... 364/200 |
| 5,241,474 A | 8/1993 | Marovac ...................... 364/419 |
| 5,316,396 A | 5/1994 | Fukaya .......................... 400/76 |
| 5,519,853 A | 5/1996 | Moran et al. ................ 395/550 |
| 5,559,933 A | * 9/1996 | Boswell ...................... 358/1.15 |
| 5,669,040 A | * 9/1997 | Hisatake ...................... 358/296 |
| 5,687,373 A | 11/1997 | Holmes et al. .............. 395/682 |
| 5,699,495 A | * 12/1997 | Snipp ......................... 358/1.15 |
| 5,796,930 A | 8/1998 | Gauthier et al. ............. 395/116 |
| 5,796,967 A | 8/1998 | Filepp et al. ................ 395/339 |
| 5,799,897 A | 9/1998 | Honegger .................... 242/528 |
| 6,313,919 B1 | * 11/2001 | Nakagiri et al. ........... 358/1.11 |

OTHER PUBLICATIONS

Logical Pages: revolutionising the use of print for teaching; Lefrere, P; Sep. 12995; 166–178.
IBM Technical Disclosure Bulletin; International Business Machines; Feb. 1995; vol. 38, No. 02; 133–134.

* cited by examiner

*Primary Examiner*—Twyler Lamb
(74) *Attorney, Agent, or Firm*—Duke W. Yee; Jeffrey S. LaBaw

(57) ABSTRACT

A method and apparatus in a data processing system for processing a print job. A call is received from an application to print the print job to a selected printer, wherein the print job includes a request to use a hardware service. A print preview of the print job prior to printing the print job is provided. Responsive to receiving an indication that the print job is to be printed after providing the print preview, the print job is sent to a device driver for the selected printer to print the print job. A determination is made as to whether the selected printer supports the hardware service. Responsive to a determination that the hardware service is unsupported by the selected printer, the hardware service is provided using a software simulation.

25 Claims, 4 Drawing Sheets

METHOD AND APPARATUS FOR SUPPORTING APPLICATION AND DEVICE INDEPENDENT PRINT SUPPORT

BACKGROUND OF THE INVENTION

1. Technical Field

The present invention relates generally to an improved data processing system and in particular to a method and apparatus for providing printer services. Still more particularly, the present invention provides a method and apparatus for providing printing services independent of an application or device driver.

2. Description of Related Art

A print preview function in word processors and other applications is a feature that displays a formatted document on the video monitor rather than sending the document directly to the printer. Often times, a print preview provides an option in which the user may send the document to the printer after receiving the document on the monitor. Previewing documents with such a function prior to actually printing hard copies is a common step. Such a preview feature is often used to avoid printing multiple copies of a document in order to reduce paper consumption. In addition, print previews also are commonly used especially in distributed data processing systems in which a user, at a client computer generating a document, will typically send the print job to a printer server at a location that is remote to that of the client. Sometimes the printer server may be located on a different floor or building from the user at the client computer. Having to print a hardcopy and retrieve the copy for review each time a draft is produced would be time consuming and burdensome. Thus, users of such systems typically use a print preview function in which a document is generated and displayed to the user as the document would be printed on a printer.

Such a mechanism is very beneficial to the user. Problems, however, exist with presently available systems because the print interfaces are inconsistent. For example, with the print preview function, each application typically has its own print preview function. One function is an N Up function, which allows the display of two or more pages on a page. Some printer hardware supports this function, while others do not. Each time a new application is created, a print preview function must be supplied by the developers of the application to support different hardware.

Therefore, it would be advantageous to have an improved method and apparatus for providing printer support for a number of different applications and device drivers.

SUMMARY OF THE INVENTION

The present invention provides a method and apparatus in a data processing system for processing a print job. A call is received from an application to print the print job to a selected printer, wherein the print job includes a request to use a hardware service. A print preview of the print job prior to printing the print job is provided. Responsive to receiving an indication that the print job is to be printed after providing the print preview, the print job is sent to a device driver for the selected printer to print the print job. A determination is made as to whether the selected printer supports the hardware service. Responsive to a determination that the hardware service is unsupported by the selected printer, the hardware service is provided using a software simulation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method, apparatus, and instructions for providing functions, such as, for example, print preview support that is independent of the particular application or printer device driver. The present invention provides a mechanism in which a set of services is callable through a common interface by a set of applications or a set of printer device drivers, which provide functionality not present in the respective application or device driver. As used herein, an "application" refers to a program designed to assist in the performance of a specific task, such as a word processing, accounting, or inventory management program. The term "device driver" is used to refer to a software component that permits a computer system to communicate with a device. In the depicted examples, this device is a printer device. In most cases, the device driver also is employed to manipulate the hardware to transmit data to the device.

The present invention provides a mechanism in which the interface is device independent and application independent, allowing support of software operations between many applications and devices. Other services that may be provided by the interface of the present invention include an N Up service and also a brochure service. In this example, a brochure service is a process that prints onto paper or other card stock in a format that allows the paper or card stock to be folded into a brochure. In addition, a print preview menu also may be displayed within a graphical user interface.

Figure 1:
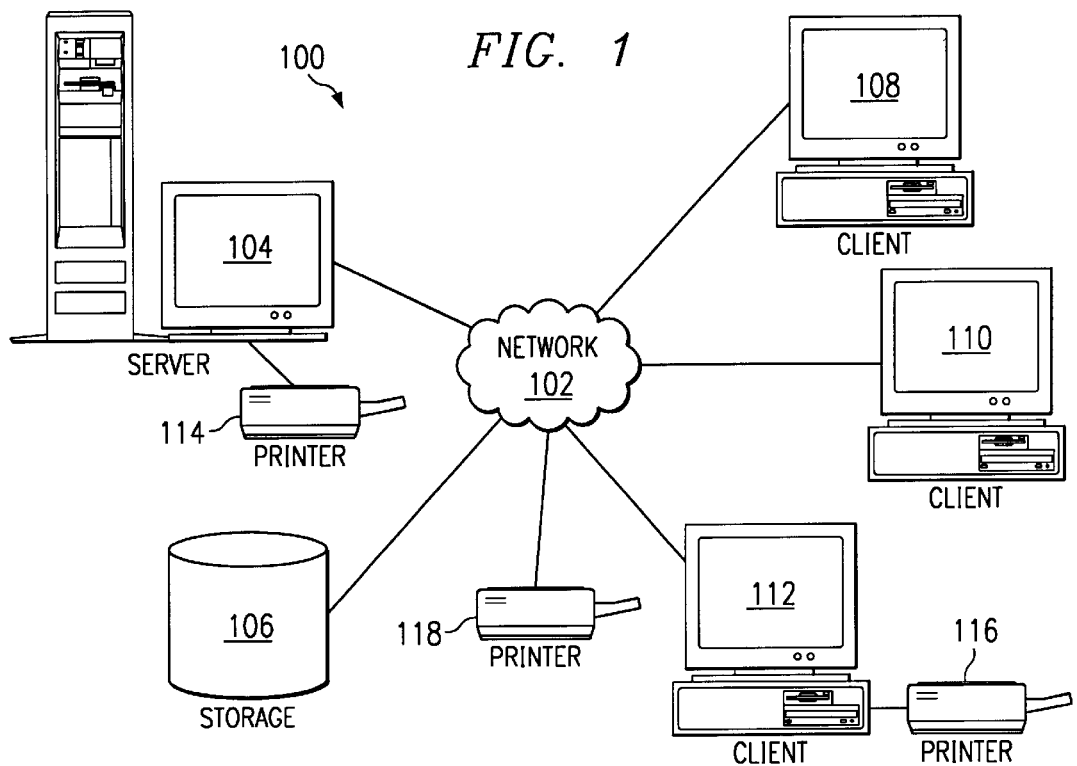
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Printers 114, 116, and 118 also are present within distributed data processing system 100. Printer 114 is attached to server 104, printer 116 is attached to client 112 and printer 118 is attached directly to the network without requiring a connection through a computer. Printer 118 is a network printer, which may receive print jobs directed towards it through a routing address, such as an IP address. Clients 108–112 may send various printer jobs for printing at printer 114 by directing those printer jobs to server 104. Printer 114 may be located remotely from one or more of clients 108–112. If network 102 is a wide area network, printer 114 may be located in another building or floor from the clients. If network 102 is the Internet, printer 114 may be located in another building or even farther in another city from one or more of clients 108–112. Printer 116 is attached to client 112. In this instance, client 112 may print directly to printer 116 or send a print job to printer 114. Alternatively, client 112 also may print to printer 118. In addition, in some cases client 112 may act as a printer server depending on how printer 116 is configured for access by other systems. In addition, server 104 also acts as a print server for clients 108–112.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
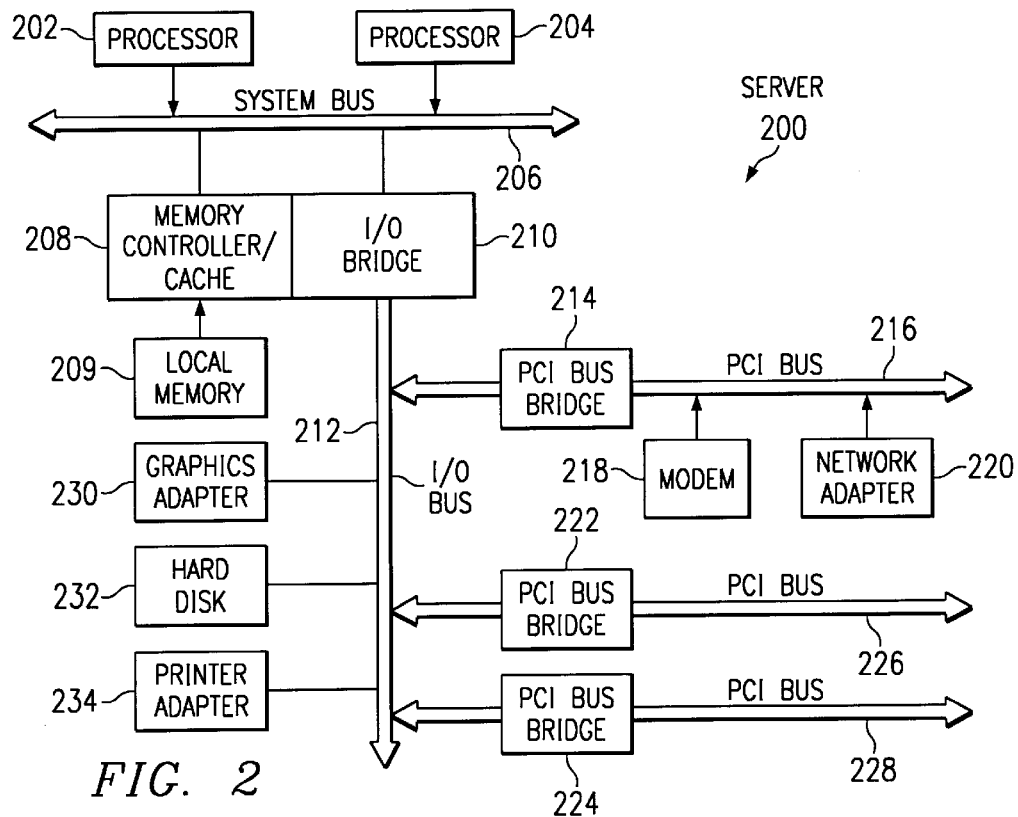
FIG. 2 is a block diagram, which depicts a data processing system, which may be implemented as a server, in accordance with the present invention.

Referring to FIG. 2, a block diagram depicts a data processing system, which may be implemented as a server, such as server 104 in FIG. 1, in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly. Server 104 also includes a printer adapter 234, which is connected to I/O bus 212. Printer adapter 234 provides a mechanism for communicating with a printer. Through printer adapter 234, server 104 may send various data for printing on a printer.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
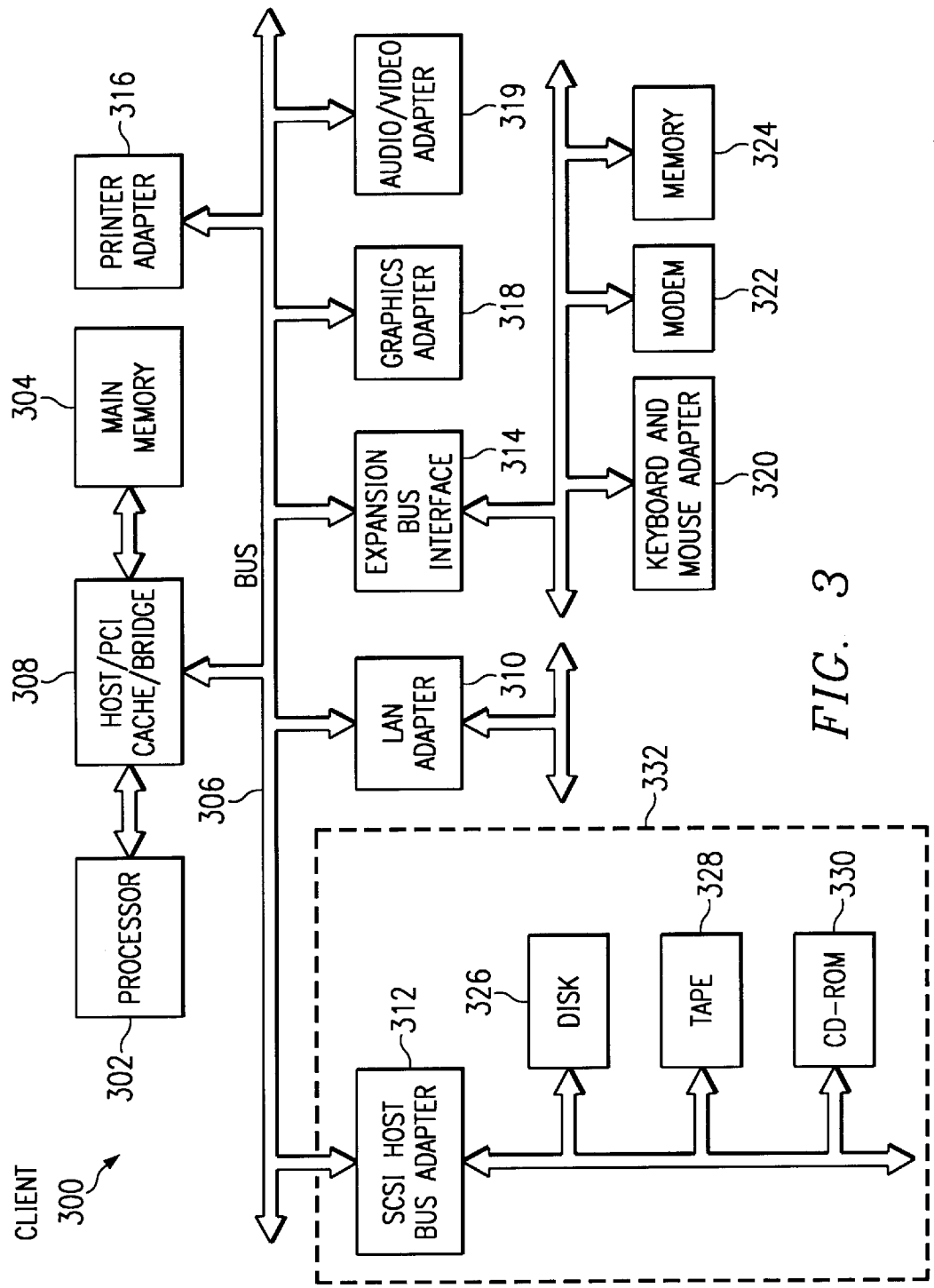
FIG. 3 is a block diagram, which illustrates a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, printer adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations.

The present invention provides a method, apparatus, and instructions for controlling printing within a distributed data processing system. The present invention provides an improved mechanism for controlling printing through a single interface located between the application layer and the device driver layer. The interface provides services callable by applications within the application layer or by devices in the device driver layer. This interface also may provide a graphical user interface (GUI), to select and/or configure a font-matching scheme to enhance the quality and performance of printing.

Figure 4:
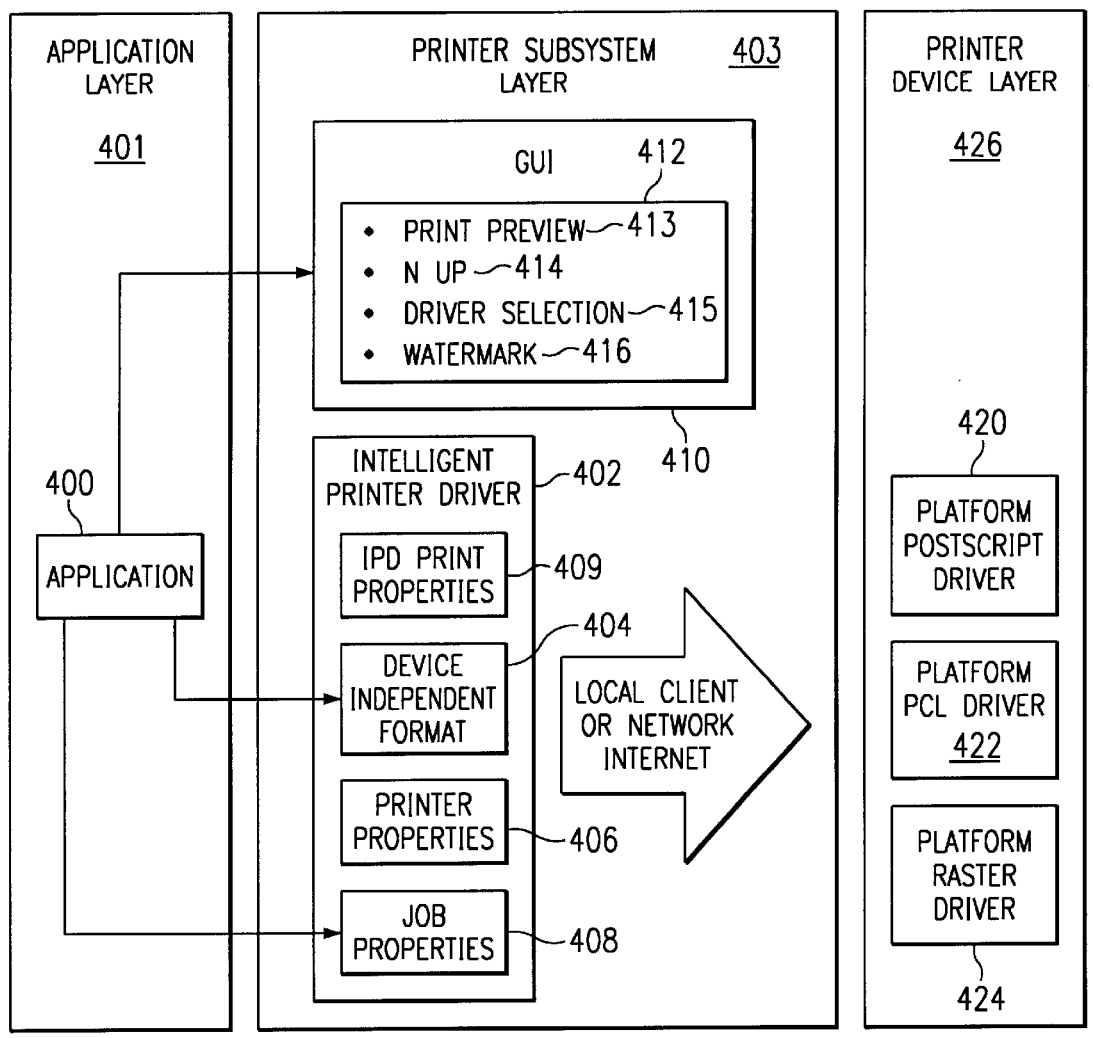
FIG. 4 is a block diagram of various components used to provide applications and device independent print preview support in accordance with a preferred embodiment of the present invention.

With reference now to FIG. 4, a block diagram of various components used to provide applications and device independent print preview support is depicted in accordance with a preferred embodiment of the present invention. In the depicted example, the user through application 400, in application layer 401, selects an intelligent print driver (IPD) 402 as a default printer as opposed to selecting a specific printer, such as a HP Laser Jet 4000 from Hewlett-Packard Company. Intelligent printer driver 402 is located in printer subsystem layer 403 and includes device independent format 404, printer properties 406, job properties 408, and IPD print properties 409. Device independent format (DIF) file 404 is a file that is independent on the operating system in which the data is to be printed. Examples of DIF files include HTML files, PGML files, and other standard meta files. Device independent format file 404 is a metafile in the depicted example. Printer properties 406 contains information as to the properties or functions supported by the particular printer, for example, whether an N Up function is supported by the printer. Job properties 408 contains information about a particular printer job. For example, job properties 408 may indicate whether a print job is to be printed in a landscape or portrait format. Information, such as color, fill, bitmap type and coordinates are stored within device independent format file 404. Intelligent print driver 402 would select normal driver calls in response to the calls stored within device independent format 404.

By selecting intelligent print driver 402, users are provided a single interface to perform various printing functions independent of the type of printer. This interface is in the form of GUI 410. In the depicted example this interface also may be implemented via a programmatic form in which the application would dynamically send job properties to the intelligent print driver rather than require a user to input these job properties through GUI 410. This interface may include IPD print properties dialogue 412, which may be used to control various print properties for intelligent printer driver 402. For example, various functions, such as print preview 413, N Up 414, driver selection 415, and watermark 416 may be accessed through IPD print properties dialog 412. Through IPD print properties dialog 412, the user may select a platform specific printer using driver selection 415 for the use with intelligent print driver 402. In this example, graphic user interface 410 will allow the user to select print preview 413, N Up 414, driver selection 415, watermark 416 or other options (not shown). These selections are stored in IPD print properties 409.

Intelligent printer driver 402 will compare the selected IPD print properties stored within IPD print properties 409 with device printer properties found in printer properties 406. If the device driver supports the IPD printer properties, then intelligent printer driver 402 will send the request to the device driver. The device driver can support the property either by single command, as in the case of most types of watermarking, or by a series of hardware commands, such as N UP, which involves hardware scaling and translation. If the device driver does not support the IPD print property, the intelligent printer driver 402 will handle its own software simulation, as will be described in more detail below.

As a result, the user can select a print job from a platform specific application, such as application 400. This print job is directed toward intelligent printer driver 402 and is converted into a device independent format (DIF) and is stored in device independent format file 404. If print preview is selected through GUI 410, then intelligent print driver 402 shows a print preview of the job on the user's monitor or screen. If the option N Up is selected then intelligent print driver 402 will query the actual platform driver to see if this platform supports the N Up function. If such a function is not supported, intelligent print driver 402 will simulate N Up via common scaling and translation techniques known to those of ordinary skill in the art. In the depicted example, intelligent print driver 402 will query various platform device drivers, such as platform postscript driver 420, platform PCL driver 422, or platform raster driver 424. These device drivers are located in printer device layer 426. This query may be made through the local client itself if the driver and printers are attached to the client or through a network, such as a local area network or the Internet.

Intelligent printer driver 402 is employed as a buffer between platform applications and platform drivers. This intelligent printer driver presents a common interface to users and applications, while maintaining device exploitation of hardware features and implementing software simulation when the user selects hardware that does not support a particular feature. Thus, intelligent printer driver 402 is part of printer subsystem layer 403, which is interposed between application layer 401 and printer device layer 426 to provide a set of services callable by any set of applications or printer device drivers.

Figure 5:
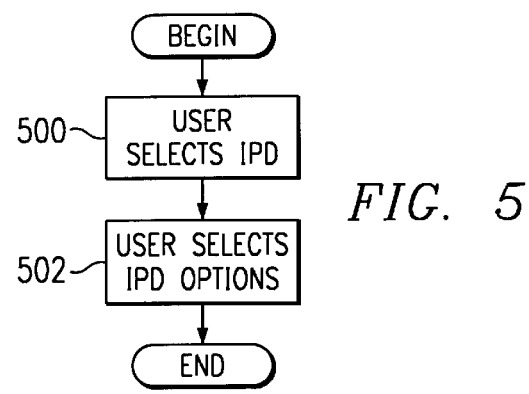
FIG. 5 is a flowchart of a process for using an intelligent print driver in accordance with a preferred embodiment of the present invention.

With reference now to FIG. 5, a flowchart of a process for using an intelligent print driver is depicted in accordance with a preferred embodiment of the present invention. The process begins with the user selecting the intelligent print driver (step 500). Thereafter, the user selects intelligent printer driver options (step 502) with the process terminating thereafter. This process is used to install an intelligent print driver as the default print driver. Such a selection results in print jobs being sent to the intelligent print driver rather than to a specific printer driver. Through the selection of intelligent print driver options, the user may select various options, such as a printer print preview, which provides for a preview of a document each time prior to printing of the document. In addition, other options such as an N Up option may be employed to allow for N Up type printing.

Figure 6:
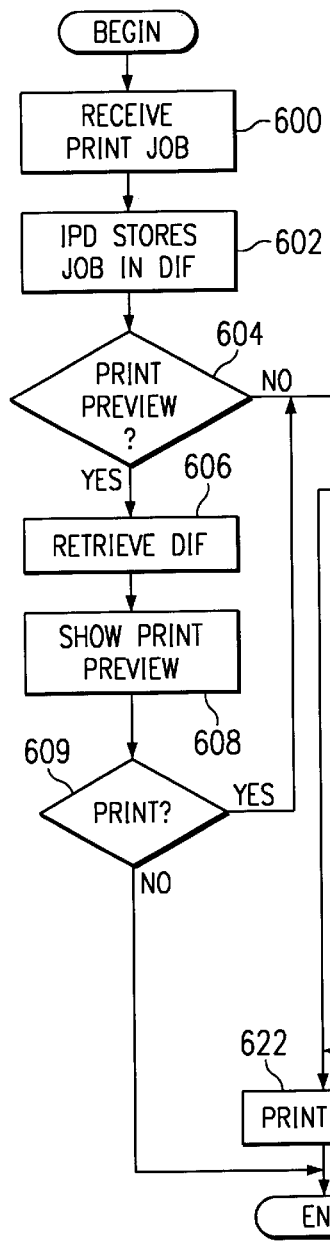
FIG. 6 is a flowchart of a process for printing a job through an independent device driver in accordance with a preferred embodiment of the present invention.

With reference now to FIG. 6, a flowchart of a process for printing a job through an independent device driver is depicted in accordance with a preferred embodiment of the present invention. The process begins by receiving a print job from an application (step 600). The print job is stored in a device independent format (step 602). Thereafter, a determination is made as to whether a print preview is to be provided (step 604). If a print preview is to be provided, the job is retrieved from the device independent format file (step 606). A print preview is then displayed to the user using that information (step 608). Thereafter, a determination is made as to whether the print job is to be printed (step 609). This step allows a user to print or cancel a print job after viewing the print preview. If the print job is to be canceled, the process terminates.

Otherwise, a determination is made as to whether a print option has been selected (step 610). This print option may include, for example, N Up, a brochure service, a watermark, or some other printing function or service. The process proceeds directly to step 610 from 604 if a print preview has not been selected. If a print option has been selected, the process then determines whether hardware support is present for this option (step 612). This determination is made by comparing the IPD print properties, such as, for example, N Up, brochure service, or watermark with the printer properties, such as those found within printer properties 406 in FIG. 4, to determine whether support is present within the particular hardware for this selected option.

If hardware support is not present for the print option in step 612, then the device independent format information is retrieved (step 614) and a software simulation is performed (step 616). The software simulation is used to provide the print option not supported by the hardware. Then, a determination is made as to whether additional unprocessed print options are present for processing (step 618). If additional print options are present, the process then selects the next unprocessed print option (step 620). The process then returns to step 612 as described above.

If additional print options are not present in step 618, the process then sends the print job to the platform selected for printing the print job (step 622) with the process terminating thereafter.

With reference again to step 612, if hardware support is present, the process proceeds to step 618 as described above. With reference again to step 610, if the print option is not selected, the process proceeds to step 622 as described above.

If the user has selected a print option, such as N Up, the intelligent print driver will query the actual platform driver to see if the platform driver supports N Up. If such support is not found, then the input intelligent print driver will simulate the N Up feature via common scaling and translation techniques. In this manner, the intelligent print driver acts as a buffer between the platform applications and platform drivers. This feature is achieved by presenting a common interface to users and applications while still maintaining device exploitation of hardware features- and implementing software simulation when selected hardware does not support a particular printing-feature.

Figure 7:
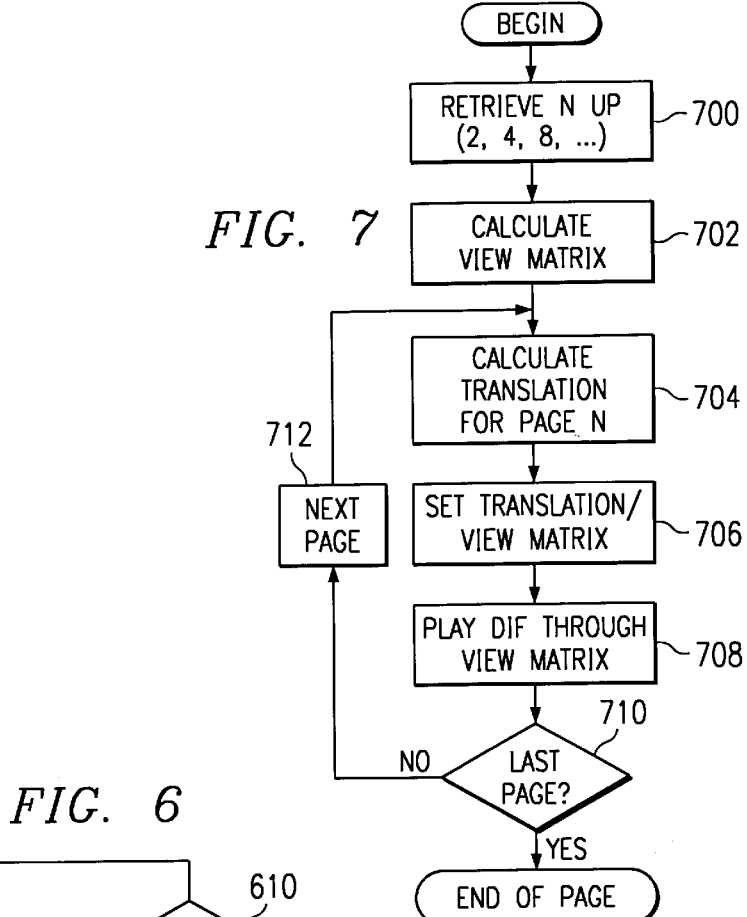
FIG. 7 is a flowchart of software simulation for an N Up option in accordance with a preferred embodiment of the present invention.

With reference now to FIG. 7, a flowchart of software simulation for an N Up option is depicted in accordance with a preferred embodiment of the present invention. This software simulation is a more detailed flowchart of step 616 in FIG. 6. The process begins by retrieving the N Up information (step 700). Thereafter, a view matrix is calculated (step 702). The view matrix is a scaling of the print-job to fit into equivalent N Up spaces. The translation for page n is then calculated (step 704). This calculation is made for each page that is to be placed into a single page. For example, if two pages are to be used in the N Up option, n will vary from one to two. If four pages are used in the N Up option, n will vary from one to four. Next, the translation/view matrix is set for the page (step 706).

Thereafter, the device independent format data is played through the view matrix (step 708). This step plays either to the device for N Up simulation, or plays to a memory buffer for print preview support. A determination is made as to whether this page is the last page (step 710). If this is the last page, the process then terminates with a single page being ready for printing through the N Up option. If this is not the last page, then n is incremented to the next page (step 712) and the process then returns to step 704.

FIG. 7 was provided as an illustration of a software simulation for a particular printing feature that may not be supported by all hardware selected by users. Other functions or printing features also may be simulated using software in the instance in which hardware support is absent for the function or feature.

The various functions illustrated may be split between a server and a client depending on the implementation. For example, the IPD may be located either at the server or the client. The print preview function is typically located at the client. The device drivers may be located either at the server or client. Additionally, The processes of the present invention may be used to support multiple users accessing a server. Support for multiple users may be handled relative to the operating system support, such as either by the client or by multiple instances of a printer on a server. For example, on a client, print properties such as those stored in IPD print properties 409, may be sent from the client to the server with a print job. Alternatively, several instances of a printer with different settings, such as N Up and landscape, may be setup on the server for access by a client.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, other functions also may be implemented in addition to print preview, N Up, and watermark. Additional functions may include scaling, color adjustments, negative/mirror image support, contrast, and brightness. As with the other functions, if hardware support is not available at the selected printer, a software simulation-of the functions may be used. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing a print job comprising:

receiving a call from an application to print the print job to a selected printer, wherein the print job includes a request to use a hardware service;

providing a print preview of the print job prior to printing the print job;

responsive to receiving an indication that the print job is to be printed after providing the print preview, sending the print job to a device driver for the selected printer to print the print job;

determining whether the selected printer supports the hardware service; and responsive to a determination that the hardware service is unsupported by the selected printer, providing the hardware service using a software simulation.

2. The method of claim 1, wherein the data processing system is a client data processing system and is in communication with a server data processing system and wherein the step of providing the print preview occurs within the client data processing system.

3. The method of claim 2, wherein the device driver is located within the server data processing system.

4. The method of claim 3, wherein the software simulation is located on the server data processing system.

5. The method of claim 3, wherein the software simulation is located on the client data processing system.

6. The method of claim 1, further comprising:

providing a graphical user interface, which is used to select the selected printer.

7. The method of claim 6, wherein the graphical user interface is located on the data processing system.

8. A method in a data processing system for processing a print job, wherein the print job includes a request to print the data in an N Up format and further comprising:

receiving a call from an application to print the print job to a selected printer, wherein the print job includes a request to use a hardware service;

providing a print preview of the print job prior to printing the print job;

responsive to receiving an indication that the print job is to be printed after providing the print preview, sending the print job to a device driver for the selected printer to print the print job;

determining whether the selected printer supports the hardware service;

responsive to a determination that the hardware service is unsupported by the selected printer, providing the hardware service using a software simulation;

determining whether the selected printer supports the N Up format; and responsive to a determination that the N Up format is unsupported by the selected printer, providing the N Up service through a software simulation.

9. A method in a computer for processing a print request, the method comprising:

receiving print requests from a plurality of applications through a common interface, wherein each print request is to be printed by a selected printer, responsive to each print request received, providing a service, wherein the service requires a function at the selected printer;

determining whether the hardware function is supported by the selected printer;

responsive to a determination that the hardware function is unsupported by the selected printer, providing the hardware function using a software simulation; and responsive to providing the service, selectively sending the each print request to a device driver for the selected printer.

10. The method of claim 9, wherein the service is a print preview service.

11. The method of claim 9, wherein each print request is sent to the device driver in response to a user input indicating that a print request should be printed.

12. The method of claim 9, wherein the service is an N Up service.

13. The method of claim 9, wherein the computer is a client computer in communication with a server computer and wherein the device driver is located on the server computer.

14. A method in a computer for processing a print request, the method comprising:

receiving print requests a plurality of applications through a common interface, wherein each print request is to be printed by a selected printer and wherein the common interface is provided by an intelligent printer driver;

responsive to each print request received, providing a service, wherein the service requires a function at the selected printer;

determining whether the hardware function is supported by the selected printer;

responsive to a determination that the hardware function is unsupported by the selected printer, providing the hardware function using a software simulation; and responsive to providing the service, selectively sending the each print request to a device driver for the selected printer.

15. A printer system layer interposed between an application layer and a printer device layer, the printer system layer comprising:

receiving means for receiving calls for printing services from a plurality of applications in the application layer; and a plurality of services callable by the plurality of applications through the receiving means, wherein the plurality of services includes a software simulation for a hardware function unsupported by a printer associated with the printer device layer.

16. A data processing system for processing a print job comprising:

receiving means for receiving a call from an application to print the print job to a selected printer, wherein the print job includes a request to use a hardware service;

providing means for providing a print preview of the print job prior to printing the print job;

sending means, responsive to receiving an indication that the print job is to be printed after providing the print preview, for sending the print job to a device driver for the selected printer to print the print job;

determining means for determining whether the selected printer supports the hardware service; and providing means, responsive to a determination that the hardware service is unsupported by the selected printer, for providing the hardware service using a software simulation.

17. The data processing system of claim 16, wherein the print job includes a request to use a hardware service and further comprises:

determining whether the selected printer supports the hardware service; and responsive to a determination that the hardware service is unsupported by the selected printer, providing the hardware service using a software simulation.

18. A data processing system for processing a print job comprising:

receiving means for receiving a call from an application to print the print job to a selected printer, wherein the print job includes a request to use a hardware service, and wherein the print job includes a request to print the data in an N Up format, and further comprising:

first providing means for providing a print preview of the print job prior to printing the print job;

sending means, responsive to receiving an indication that the print job is to be printed after providing the print preview, for sending the print job to a device driver for the selected printer to print the print job;

first determining means for determining whether the selected printer supports the hardware service;

second providing means, responsive to a determination that the hardware service is unsupported by the selected printer, for providing the hardware service using a software simulation;

second determining means for determining whether the selected printer supports the N Up format; and third providing means, responsive to a determination that the N Up format is unsupported by the selected printer, for providing the N Up service through a software simulation.

19. A data processing system for processing a print request, the data processing system comprising:

receiving means for receiving print requests from a plurality of applications through a common interface, wherein each print request is to be printed by a selected printer;

providing means, responsive to each print request received, for providing a service, wherein the service requires a function at the selected printer;

determining means for determining whether the hardware function is supported by the selected printer, providing means, responsive to a determination that the hardware function is unsupported by the selected printer, for providing the hardware function using a software simulation; and selective means, responsive to providing the service, for selectively sending the each print request to a device driver for the selected printer.

20. The data processing system of claim 19, wherein the service is a print preview service.

21. The data processing system of claim 19, wherein the service is sent to the device driver in response to a user input indicating that the print request should be printed.

22. The data processing system of claim 19, wherein the service is an N Up service.

23. A computer program product in a computer readable medium for processing a print job comprising:

first instructions for receiving a call from an application to print the print job to a selected printer, wherein the print job includes a request to use a hardware service;

second instructions for providing a print preview of the print job prior to printing the print job;

third instructions, responsive to receiving an indication that the print job is to be printed after providing the print preview, for sending the print job to a device driver for the selected printer to print the print job;

fourth instructions for determining whether the selected printer supports the hardware service; and fifth instructions, responsive to a determination that the hardware service is unsupported by the selected printer, for providing the hardware service using a software simulation.

24. A computer program product in a computer readable medium for processing a print request, the computer program product comprising:

first instructions for receiving print requests from a plurality of applications through a common interface, wherein each print request is to be printed by a selected printer;

second instructions, responsive to each print request received, for providing a service, wherein the service requires a function at the selected printer;

third instructions for determining whether the hardware function is supported by the selected printer;

fourth instructions, responsive to a determination that the hardware function is unsupported by the selected printer, for providing the hardware function using a software simulation; and fifth instructions, responsive to providing the service, for selectively sending the each print request to a device driver for the selected printer.

25. A data processing system for processing a print job, the data processing system comprising:

a bus system;

a communications unit connected to the bus system;

a memory connected to the bus system, wherein the memory includes a set of instructions; and a processing unit connected to the bus system, wherein the processing unit executes the set of instructions to receive a call from an application to print the print job to a selected printer, wherein the print job includes a request to use a hardware service; provide a print preview of the print job prior to printing the print job; send the print job to a device driver for the selected printer to print the print job in response to receiving an indication that the print job is to be printed after providing the print preview; determine whether the selected printer supports the hardware service; and provide the hardware service using a software simulation in response to a determination that the hardware service is unsupported by the selected printer.

* * * * *